(12) United States Patent
Popovic et al.

(10) Patent No.: US 6,836,611 B2
(45) Date of Patent: Dec. 28, 2004

(54) LIGHT GUIDE AND LATERAL ILLUMINATOR

(75) Inventors: Dragoslav Popovic, Germantown, WI (US); David Allen Venhaus, West Allis, WI (US)

(73) Assignee: J. W. Speaker Corporation, Germantown, WI (US)

( * ) Notice: Subject to any disclaimer, the term of this patent is extended or adjusted under 35 U.S.C. 154(b) by 252 days.

(21) Appl. No.: 10/263,539

(22) Filed: Oct. 3, 2002

(65) Prior Publication Data

US 2004/0067038 A1 Apr. 8, 2004

(51) Int. Cl.[7] .................................................. F21V 8/00
(52) U.S. Cl. ....................... 385/146; 385/125; 385/133; 385/901; 385/902; 362/551; 362/559; 362/562; 362/578
(58) Field of Search ................................. 385/123, 133, 385/146, 901, 902; 362/551, 559, 562, 578

(56) References Cited

U.S. PATENT DOCUMENTS

| | | | |
|---|---|---|---|
| 4,422,719 A | 12/1983 | Orcutt | |
| 4,907,132 A | 3/1990 | Parker | |
| 5,005,108 A | 4/1991 | Pristash et al. | |
| 5,042,892 A | 8/1991 | Chiu et al. | |
| 5,136,480 A | 8/1992 | Pristash et al. | |
| 5,555,329 A | 9/1996 | Kuper et al. | |
| 5,590,945 A | 1/1997 | Simms | |
| 5,613,751 A | 3/1997 | Parker et al. | |
| 5,618,096 A | 4/1997 | Parker et al. | |
| 5,876,107 A | 3/1999 | Parker et al. | |
| 6,079,838 A | 6/2000 | Parker et al. | |
| 6,158,867 A | 12/2000 | Parker et al. | |
| 6,185,356 B1 | 2/2001 | Parker et al. | |
| 6,272,265 B1 | 8/2001 | Franklin | |
| 6,351,594 B1 * | 2/2002 | Nakamura et al. | 385/146 |
| 6,361,180 B1 | 3/2002 | Iimura | |

* cited by examiner

*Primary Examiner*—Nikita Wells
*Assistant Examiner*—David A. Vanore
(74) *Attorney, Agent, or Firm*—Quarles & Brady LLP (57) ABSTRACT

A lighting apparatus for providing a substantially uniformly illuminated light emitting surface, the apparatus comprising first and second light sources generating flux patterns including light rays that diverge about first and second central light rays, respectively and a light guide member having substantially straight first and second en sections and a curved section, the first end section having a proximal end and a distal end and formed about a first light axis, the second end section having a proximal end and a distal end and formed about a second light axis, the curved section including first and second ends that are linked to the distal ends of the first and second end sections, respectively, the guide forming a front surface and an oppositely facing textured back surface along each of the end sections and the curved section, the curved section forming a bend such that the back surface is concave and the front surface is convex along the curved section length, at least a portion of the back surface tapered toward the first light axis in the direction from the proximal end to the distal end of the first end section, wherein, the first light source is juxtaposed such that the central light ray is directed along the first light axis and the second light source is juxtaposed such that the central light ray is directed along the second light axis.

30 Claims, 8 Drawing Sheets

LIGHT GUIDE AND LATERAL ILLUMINATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is lighting systems and more specifically a light guide that provides essentially uniform illumination from a bent surface of the guide.

Ever since development of the first light generating electrical filament, there has been a desire to control light to provide various lighting affects. One light control mechanism is a light guide or pipe. A light guide generally comprises an elongated transparent or translucent member having external surfaces. As well known in the art, when a light ray is directed within a light guide and subtends a surface of the guide, if the incident angle formed by the light ray and the surface is less than a critical angle, the light is reflected back into the guide along a trajectory that defines a reflected angle equal to the incident angle and toward another surface of the guide. Thus, if a guide is designed properly and light rays directed into a guide end are directed along suitable trajectories, in theory, the guide should facilitate total internal reflection (TIR) of the light and hence pass all of the light to an opposite end of the guide.

If the incident angles formed by light rays that subtend a guide surface are greater than the critical angle, the light is emitted through the guide surface and illuminates the area adjacent the emitting surface.

It is also known that deformities can be formed in a guide surface or within the guide itself to control the amount of light emitted from different sections of a light guide within limits. Exemplary U.S. Pat. No. 6,185,356 (hereinafter "the '356 patent") which is entitled "Protective Cover for a Lighting Device" and which issued on Feb. 6, 2001 teaches various types of illuminators that are integrally formed with surgical instruments (e.g., retractors, forceps, etc.) to provide light at desirable locations proximate the surgical implements.

In general, the '356 patent teaches that guide surface deformities such as textured surfaces, particles within the guide, etc., scatter or "randomize" light rays within a guide. Thus, guides can be constructed to both deliver right rays and to then disperse the light rays at desired locations along the guide length. To deliver light, a guide section can be designed to facilitate TIR. To disperse light rays and provide light at specific locations, deformities are formed in the guide that alter light ray trajectories and thereby cause at least a portion of the rays passing through the guide to travel along trajectories forming incident angles with guide surfaces that are greater than the critical angle—hence causing the rays to be emitted from the guide surface.

The '356 patent also generally recognizes that a uniform lighting effect can be provided by varying the deformity pattern along a guide surface. For instance, assume that an elongated light guide includes a first segment adjacent a light source and a second segment adjacent the first segment, that the lengths of the first and second segments are identical and that a light source directs 10 units of light into a distal end of the first segment opposite the second segment. Also assume that deformities along the first segment cause three units (e.g., 30% of the total light from the source) of the light to refract out of the guide surface so that only seven units of light are passed on to the second guide segment. Here, if the second segment includes deformities having light refracting properties similar to the first segment, approximately 30% of light entering the second segment (i.e., approximately 2.3 units) is refracted out the surface along the second segment length and, therefore, the intensity of light emitted along the second segment is less than along the first segment.

However, if deformities are provided in the second segment surface that cause approximately 43% of the light entering the second segment to be emitted along the second segment length, approximately three units of the seven units entering the second segment are emitted along the second segment surface and hence similar quantities of light are emitted from the first and second guide segments. This principle of non-uniform deformities can be applied to a large number of small adjacent guide segments to provide a substantially uniform lighting affect.

In the case of a textured surface, the randomizing texture can be formed on either or both of an emitting guide surface (i.e., a surface from which light is intended to be emitted) and a primarily reflecting surface opposite or at least substantially opposed to the emitting surface. In the case of a textured emitting surface, the texture alters the angle of the surface subtended by the light rays so that the incident angle with the small subtended surface is greater than the critical angle and light is emitted. In the case of the textured reflecting surface, the texture causes reflected light rays to travel toward the emitting surface along trajectories that form incident angles with the emitting surface that are greater than the critical angle and hence, similarly, cause light ray emission.

The '356 patent also recognizes that a textured surface can be formed by molecularly bonding some type of coating material to a guide surface. The molecular bonding process, in effect, causes small hills and valleys (i.e., texture) on the bonded guide surface. The bonding and texturing process may include a painting or spraying procedure followed by a curing period, other material deposit type processes, forming of a guide about a thin reflective member (e.g., a plastic member), etc.

In addition, the '356 patent recognizes that the coating material bonded to a guide may be light opaque so that light rays are not emitted from the coated surface of the guide but rather are redirected back into the guide. Here, where the coating material has a specific color, the color will affect the appearance of the light emitted from the emitting surface. For instance, a white paint coat on a reflecting surface affects the appearance of the emitting surface.

While the '356 patent teaches some useful concepts, the '356 patent has some shortcomings when used to provide certain effects. First, while deformity variance along a guide length can be provided to cause essentially uniform illumination from each guide segment, where the deformity variance is too great, the visual effect of the different guide segments will often be very different. Thus, for instance, one guide segment having ten times the deformities as another segment may cause a similar quantum of light to escape the guide along a similar length but the deformities may cause a different light pattern. This variable appearance problem is particularly acute in the case of long illuminating surfaces where distal guide segments are a relatively long distance from a light source than are other segments and the degree of deformity necessary to facilitate a uniform appearance is excessive.

Second, the '356 patent fails to teach a configuration having a uniformly appearing emitting surface that has both a linear and a curved component. In this regard, when a light source directs light through a linear guide section and then into a curved guide section adjacent the linear section, and a reflecting coating is provided on a guide surface opposite an emitting surface, often "shadows" or "dark spots" will appear when the emitting surface of the curved section is viewed. This "spotting" phenomenon occurs because light exiting the linear section of the guide is generally along trajectories parallel to the guide length and hence the rays shoot past the beginning and middle part of the curved section, subtend the ending part of the curved section and non-uniformly illuminate the curved section. The '356 patent fails to recognize this phenomenon as a problem, and instead, teaches guide configurations that either geometrically do not have the spotting problem or that take advantage of the problem. In this regard, the '356 patent teaches two relevant configurations.

First, in some embodiments (e.g., the illustrated retractor) the '356 patent accepts the curved illumination problem and designs illuminators that take advantage of a small radius curve to emit light from the curved surface toward an area of interest. In this case the guide segment leading to the curved surface and the segment downstream of the curved section emit little if any light—an acceptable affect given the nature of a retractor or other type of surgical tool.

Second, in some embodiments the '356 patent teaches guides (e.g., a ring-shaped rope) having substantially curved surfaces that do not include a reflective coating. In these cases the '356 patent relies primarily on deformities within the guide member (i.e., reflecting particles) or deformities within the guide surfaces themselves to cause light emission. Thus, here, as in the case of a long and narrow guide member, light emission is a function of the number and type of deformity and guide member curves and related surface juxtapositions are essentially irrelevant. While this solution provides a relatively tight curved emitting surface, unfortunately, without a reflective surface opposite a desired emitting surface, at least a portion and, in many cases, a large percentage (e.g., 50%) of guide light is emitted from the surface opposite the desired emitting surface and light intensity is appreciable reduced. In addition, it is doubtful that, even with a careful selection of surface deformity variance, that a uniform appearance can be attained via texturing alone due to the "spotting" phenomenon described above.

One other attempt to provide a bent light configuration is described in U.S. Pat. No. 4,907,132 (hereinafter "the '132 patent") which is entitled "Light Emitting Panel Assemblies and Method of Making Same" which issued on Mar. 6, 1990. The '132 patent teaches a woven fiber optic material that includes bends formed in the optic fibers at discrete locations to allow light to be emitted therefrom. The fibers are woven so tightly that, despite the fact that each fiber only emits light from its bends, the overall effect is substantially uniform light emittance.

One obvious problem with this solution is that, despite attempts to weave an extremely fine material, it is extremely difficult to provide a material that, when illuminated, effectively renders the separate fiber bends indistinguishable. Even if a material could be provided that is tight enough to render adjacent fabric bends indistinguishable, the material would likely be far too expensive to manufacture for most applications.

Thus, there is a need for an illuminator that is simple and inexpensive to manufacture and that provides a uniformly illuminated relatively tightly curved or bent emitting surface and an adjacent linear surface where the emitting surface has a uniform appearance.

BRIEF SUMMARY OF THE INVENTION

The invention includes a lighting apparatus for providing a substantially uniformly illuminated light emitting surface, the apparatus comprising first and second light sources generating flux patterns including light rays that diverge about first and second central light rays, respectively and a light guide member having substantially straight first and second en sections and a curved section, the first end section having a proximal end and a distal end and formed about a first light axis, the second end section having a proximal end and a distal end and formed about a second light axis, the curved section including first and second ends that are linked to the distal ends of the first and second end sections, respectively, the guide forming a front surface and an oppositely facing textured back surface along each of the end sections and the curved section, the curved section forming a bend such that the back surface is concave and the front surface is convex along the curved section length, at least a portion of the back surface tapered toward the first light axis in the direction from the proximal end to the distal end of the first end section. Here, the first light source is juxtaposed such that the central light ray is directed along the first light axis and the second light source is juxtaposed such that the central light ray is directed along the second light axis.

In one embodiment of the invention the degree of taper along the first end section increases from the proximal end to the distal end. In a more specific embodiment at least a portion of the back surface tapers toward the second light axis in the direction from the proximal end to the distal end of the second end section and the degree of taper along the second end section increases from the proximal end to the distal end. Even more specifically, in an embodiment the rate of taper increase is constant along the lengths of each of the first and second end sections.

In one embodiment the first end section includes X equi-length segments and the degree of taper changes N degrees along each of the X segments. Here, N may be between 1 and 5 degrees.

The first end section may form a proximal end width dimension between the front and back surfaces and the length of each equi-length segment may be between three and seven times the proximal end width dimension. More specifically, the length of each equi-length segment may be approximately five times the proximal end width dimension.

In some embodiments a width dimension between the back and front surfaces is uniform along the length of the curved section. In addition, a texture may be provided along at least a portion of the front surface. Moreover, the guide may form top and bottom surfaces and at least a portion of each of the top and bottom surfaces may be textured.

Some embodiments further include a coating layer on the back surface and the texture is provided on the back surface by a molecular bond between the coating layer and the back surface. More specifically, the coating layer may include a plastic member and the plastic member may be white.

In some embodiments the first and second light axis form an angle between 60 degrees and 130 degrees. In a particularly advantageous embodiment the first and second light axis form an angle of approximately 90 degrees.

The invention also includes a lighting apparatus for providing a substantially uniformly illuminated light emitting surface, the apparatus comprising a light source generating a flux pattern including light rays that diverge about a central light ray and a light guide member having a substantially straight end section and a curved section, the end section having a proximal end and a distal end and formed about a light axis, the curved section including first and second ends and linked at the first end to the distal end of the end section, the guide forming a front surface and an oppositely facing and textured back surface along the end section and the curved section, the curved section forming a bend such that the back surface is concave and the front surface is convex along the curved section length, at least a portion of the back surface tapered toward the light axis in the direction from the proximal end to the distal end. Here, the light source is juxtaposed such that the central light ray is directed along the light axis.

Here, the degree of taper may increase from the proximal end to the distal end. In addition, the rate of taper increase may be constant along the length of the end section. Moreover, the end section may include X equi-length segments and the degree of taper may change N degrees along each of the X segments.

In one embodiment the end section forms a proximal end width dimension between the front and back surfaces and the length of each equi-length segment is approximately five times the proximal end width dimension.

In some embodiments the end section is a first end section and the light source is a first source, the apparatus further including a second end section and a second light source, the second end section including proximal and distal ends and formed about a second light axis, the second light source generating a flux pattern including light rays that diverge about a central light ray, the second end section linked to the second end of the curved section and the second light source is juxtaposed such that the central light ray of the second source is directed along the second light axis.

The front surface may be substantially parallel to the light axis along the end section. In the alternative, at least a portion of the front surface forms an angle with respect to the light axis.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

While the present invention may take in many different embodiments, there is shown in the drawings and will hereinafter be described an exemplary embodiment of the invention with the understanding that the present disclosure is not intended to limit the invention to the specific embodiment illustrated.

Unless indicated otherwise, hereinafter the phrase "reflecting surface" will be used to refer to a surface of a guide member that has been treated (e.g., textured, coated, etc.) to essentially randomly reflect light rays subtending the surface along reflected angles that are different than incident angles. The phrase "emitting surface" will be used to refer to the guide surface opposite a reflecting surface through which light rays are emitted from the guide. The phrases "proximal end" and "distal end" will be used to refer to the ends of a guide, a guide section or a guide segment that are relatively close and relatively distant from a light source associated therewith, respectively.

In addition, while the invention is described as being implemented using a conventional light emitting diode (LED), it should be understood that any relatively bright light source may be used with the inventive concepts.

A. Theory

It has been recognized that, instead of simply relying on different quantities or qualities of guide deformity along the length of a light guide to provide a uniform light guide surface, the shape of a reflecting surface of a guide coated with a reflecting coating or member or appropriately textured can be used to control light uniformity. To this end, referring to FIG. 1, generally, a light source such as an LED 14 or the like generates a flux pattern including one central ray 17 along a central axis and additional rays (e.g., 69) that fan out on either side of the central light axis. Typically, the central ray 17 has a relatively high intensity and the ray intensities corresponding to the other rays that are angled with respect to central ray 17 are less than the central ray intensity such that a plot of intensity with respect to the angles ζ that the rays form with central ray 17 forms a bell-shape as illustrated in FIG. 2.

Figure 1:
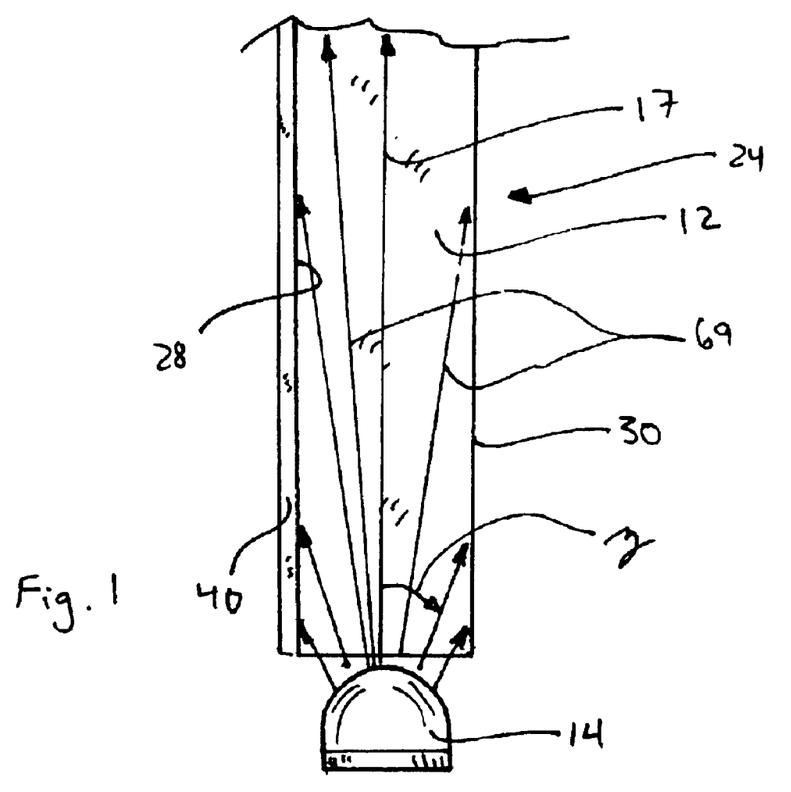
FIG. 1 is a schematic diagram illustrating a light guide phenomenon necessary for proper understanding of the present invention.
Figure 2:
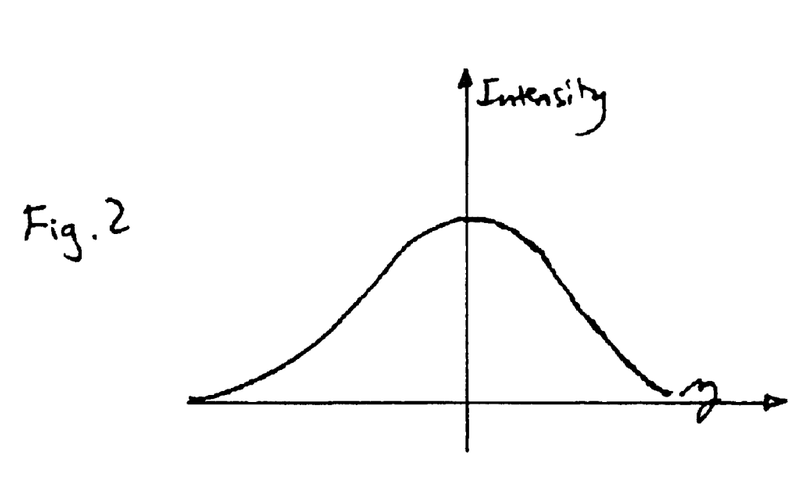
FIG. 2 is a graph illustrating a light flux intensity profile for a typical light source used with the present invention.

Referring still to FIG. 1, a linear guide section 24 is illustrated that includes a planar reflecting surface 28 that is essentially parallel to central ray 17 and a similar emitting surface 30 where source 14 is positioned at a source end of the substantially linear guide section 24 with the central axis 17 directed along the section length. Section 24 is provided with a reflecting coating 40 on surface 28 opposite emitting surface 30. Because the coated surface 28 is parallel to the central axis, more flux impacts the coated surface 28 adjacent source 14 than at the opposite end, the coated surface 28 reflects different light intensities through the different sections of the emitting surface 30 and the guide appears to be non-uniformly illuminated.

Figure 3:
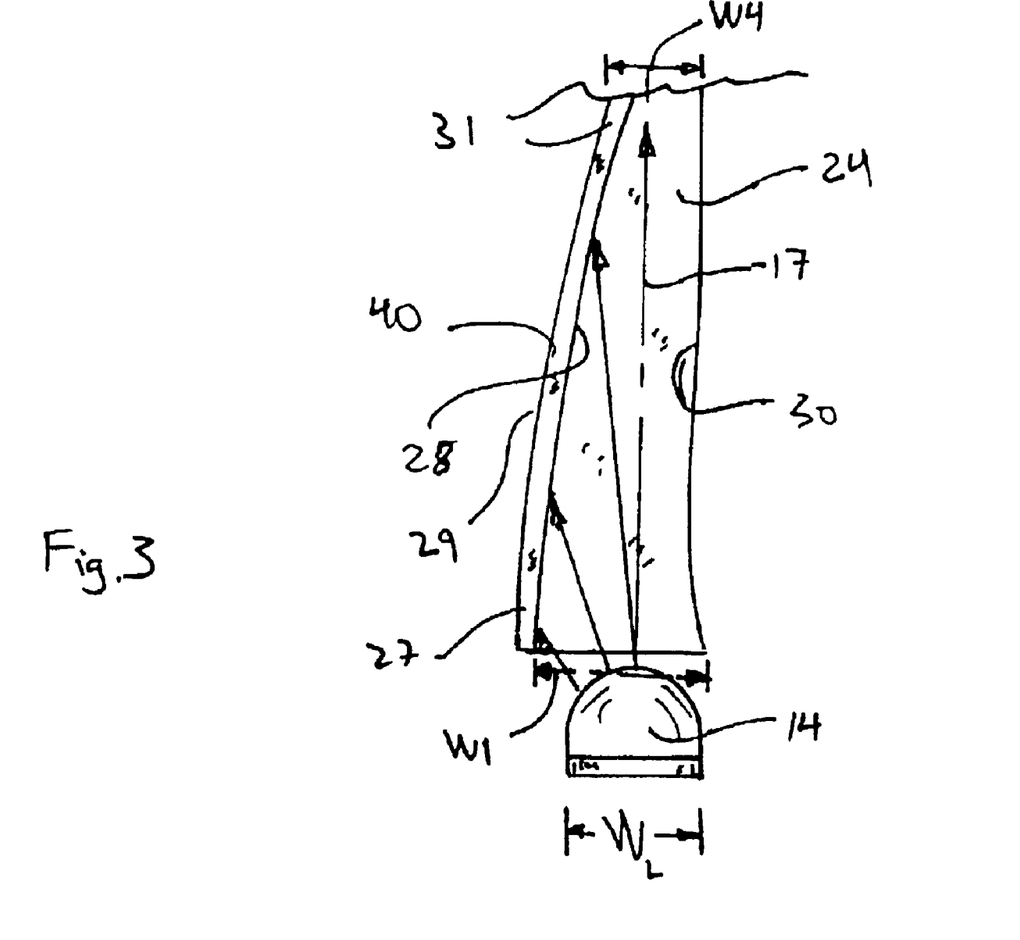
FIG. 3 is a schematic diagram similar to FIG. 1, albeit illustrating various tapered surfaces of a light guide.

However, referring to FIG. 3, if the coated surface is tapered toward central axis 17 at the distal end (i.e., the end of the linear section opposite the light source) as is surface 28, the amount of flux subtending the distal end of the section is increased and hence the light intensity emitted from the emitting surface 30 adjacent the distal end is likewise increased. It has been determined that proper taper selection along a linear section of a guide can produce a light effect such that a relatively long linear guide section appears to be substantially uniformly illuminated.

More specifically, it has been recognized that the degree of taper of a coated surface 28 (i.e., a surface having a reflecting coating thereon) on a linear guide section should be increased along the length of the section from the source to the opposite end of the section. For instance, in FIG. 3, at the proximate light source end (e.g., at 27 in FIG. 1), the degree of taper may be one degree, one-third of the way along the linear section (e.g., at 29 in FIG. 1) the degree of taper may be 3° and two-thirds of the way along the linear section (e.g., at 31 in FIG. 1) the degree of taper may be 5°. The tapered coated surface is, in effect, used to control the percentage of the total light inside guide section 24 that is reflected out of emitting surface 30 at any given point long the linear section 24. Importantly, when chosen properly, the different quantities of light emitted from similar lengths of the linear section are visually indistinguishable.

One rule of thumb for identifying a suitable rate of taper change along a section length is to divide the section into equi-length segments and ascribe a desired taper angle to the end of the segment closest to the light source where the degree of taper is incremented by the same angle between each two segment ends. For instance, as indicated above, in one embodiment, where the guide section is divided into three equi-length segments, the degrees of taper at the proximal ends of each segment may be, starting with the segment closest to the source, 1°, 3° and 5°, respectively. At the distal end of the third segment the taper may be 7°.

In one embodiment the taper may be formed in a stepwise fashion so that the taper along each segment is uniform. In another embodiment the taper may change smoothly along the length of each segment so that boundaries between the segments are unperceivable.

It is contemplated that longer linear sections would include a larger number of equi-length segments (e.g., 4, 5, 6, etc.) while shorter linear sections would include a smaller number of equi-length segments (e.g., 1 or 2).

In at least one embodiment, light source 14 characteristics are used as a starting point for selecting suitable guide section dimensions, tapers, etc. To this end, generally, referring still to FIG. 3, the light source 14 will have a characteristic width dimension $W_L$ through which a large percentage (e.g., 80%+) of the light flux generated thereby passes. To capture and use most of the flux generated by source 14, the source end 27 of guide section 24 should be at least as wide as the light width $W_L$. Often aesthetic considerations will require that the guide width be as minimal as possible at the guide ends and therefore, in many applications, the optimal guide end width will be $W_L$. In the case of a conventionally sized LED, the source end width in at least one embodiment is $5/16^{th}$ of an inch. Hereinafter, unless indicated otherwise, an exemplary guide will be described as including a $5/16^{th}$ inch source end width.

It has been determined through experimentation that the optimal length of an equi-length guide segment should be in the range of three to seven times the source width $W_L$. For instance, in the case of the exemplary guide that has a source end width of $5/16^{th}$ of an inch to accommodate an LED, the equi-length segment length may be selected from within a range of $15/16^{th}$ and $35/16^{th}$ inches. Experiments have also shown that a particularly advantageous ratio of segment length to source end width is approximately 5 to 1 so that, with a $5/16^{th}$ inch source end width, the equi-length segments would be approximately 1½ inches each.

Once an optimal segment length has been selected and the overall length of a linear section has been selected, the number of equi-length segments for the section can be determined by dividing the overall section length by the segment length. For instance, where the overall section length is to be 4½ inches and the optimal equi-length segment length is 1½ inches, the section would be divided into three equi-length segments.

Experiments have shown that one suitable change in taper along the length of each equi-length segment of a linear section of a guide is approximately 2°. Other degrees of taper are contemplated (e.g., 1°–5° per equi-length segment). Although the inventors are unclear as to why these length ranges and taper ranges above are advantageous, it is believed that, given the flux intensity profile(e.g., see again FIG. 2) of a conventional LED, equi-length segments in the range above and taper angles in the range above, cause similar light ray quantums per unit length to be reflected along trajectories that form incident angles with the emitting surface that are greater than the critical angle. Other ranges corresponding to other light types having other flux intensity profiles are contemplated. For instance, at least one embodiment of the invention contemplates a lens between a light (e.g., an LED) and the source end of the guide that essentially focuses the light more along a central light axis. In this case, the coated reflecting surface may have a rate of taper change that is less at a distal end of the liner section than at the source end. For example, in the case of a three segment linear section, the degree of taper at the source end may be 2°, the degree of taper at the proximal end (e.g., the end closest to the source) of the second segment may be 4° (i.e., a rate of taper change of 2° along the segment) and the degree of taper at the proximal end of the third segment may be 5° (i.e., a rate of taper change of 1° along the third segment).

The emitting surface is generally planar and substantially parallel to the central light axis in several embodiments of the inventive guide. Nevertheless, it has been recognized that, slight and gradual deviations of the emitting surface from a plane parallel to the central light axis only minimally affect the amount of light emitted. For this reason, slight and gradual deviations in the emitting surface from a plane parallel to the central light axis are acceptable to meet style requirements. For instance, in some applications it may be desirable for the emitting surface to be formed flush with adjacent panel surfaces on a vehicle where the panels have a slight curvature. Here the emitting surface may be formed to conform to the vehicle panel surfaces without appreciably affecting the lighting effects.

For instance, referring again to FIG. 3, emitting surface 30 is shown as initially tapering toward central axis 17 at guide end 27 adjacent source 14 and thereafter tapering away from central axis 17 over a short dimension. At the distal end 31 surface 30 is essentially parallel to axis 17.

Referring still to FIG. 3, while rules of thumb are provided above regarding suitable dimensions and taper angle, in general, the shape of back reflecting surface 28 is related to the flux intensity profile of light 14. For this reason, it is important that light 14 be placed in the specific position for which surface 28 is designed. Once the required light position is identified, the light position should not be altered even when stylistic changes are made to emitting surface 30. For instance, in FIG. 3, if, for a particular application the proximal end 27 of guide 24 where to be constructed having a width W1 twice as wide as illustrated, the relative juxtaposition of light 14 with respect to surface 28 would be unchanged.

It has also been determined that a curved or bent guide section can be linked to the distal end of an essentially linear guide section (e.g., 24) constructed in accordance with the teachings above to provide a unique lighting effect. In short, by applying the above teachings and providing a curved section opposite the light source, an emitting surface that includes both a substantially flat and elongated segment and a curved segment are provided where the entire emitting surface has a uniformly illuminated appearance.

The uniform visual appearance is a result of the increased taper at the distal end of the linear section. In this regard, unlike prior bent or curved guide sections where light entering the curved section is along a trajectory that is essentially tangent to an arc passing through the end of the section closest to the source, in the present case, at least some of the light adjacent the distal end of the linear guide section subtends the tapered reflecting surface and is reflected along random trajectories. A portion of the light reflected at the distal end of the linear section is emitted through the emitting surface at the distal end. Another portion of the reflected light is directed back toward the emitting surface, is internally reflected off the emitting surface and subtends another part of the reflecting surface, this time within the first part of the curved section. The light subtending the first part of the curved section illuminates the section.

Thus, the tapered reflecting surface at the distal end of the linear section operates to "randomize" the trajectories of light rays entering the curved guide section that would otherwise be directed along trajectories essentially parallel to the central light axis thereby causing illumination of the first and middle parts of the curved section.

In at least one embodiment of the invention the width (i.e., dimension between the reflecting surface and the emitting surface) of the curved section is essential constant and hence the emitting surface has a curve similar to that of the reflecting surface. This limitation is not required and, instead, the curved section width may vary slightly without appreciably affecting the uniform illuminating appearance. The uniform width, however, is advantageous as it has been determined that a constant width facilitates the desired uniform results.

The radius of the curved section in at least one embodiment of the invention should be selected so that, despite the randomizing affect of the tapered reflecting surface, an appreciable amount of light flux passes through to the later parts of the curved section. To this end, one suitable range of curve radii is between 10 and 20 times the width of the curved guide section. A particularly advantageous radius to width ratio is approximately 16 to 1 so that, for instance, if the curved guide section thickness is $\frac{1}{8}^{th}$ of an inch, a suitable radius may be approximately 2 inches.

It has also been determined that, in addition to the configurations described above, another unique configuration may be provided including first and second essentially linear and relatively long end sections and a curved mid-section therebetween. Here, each of the end sections would be designed by applying the theory above to identify suitable component dimensions and taper rates of change.

In some embodiments of the invention the first and second substantially linear end sections will have different lengths. For instance, in one embodiment the first end section may be 1½ inches long while the second end section is 4½ inches long.

Generally, the mid-section width dimension will be a function of design constraints related to each of the first and second end sections and practical limitations related to a minimum width necessary to cause a desired effect. With respect to practical limitations, for instance, where the guide is tinted a color (e.g., orange, red, yellow), there will be at least some minimum width requirement to ensure that the mid-section color does not appear "washed out" relative to the relatively wider and sections adjacent thereto.

With respect to constraints on mid-section width related to the end sections, generally, where the end sections require taper, the mid-section width will be less than the source end widths. Thus, referring again to FIG. 3, assume a guide configuration where the emitting surface 30 along first end section 24 is substantially parallel to the central light axis 17 and where the end section has a length requiring three separate equi-length segments as described above where the taper increases by 2° between each two adjacent proximal ends of the segments. In this case, clearly the width W4 of the first end section adjacent the curved section (not illustrated) will be less than the width W1 at the source end of the first end section 24. Thus, in this case, the curved section width will be a function of the first end width W1 at the source end, the length of the first end section 21 and the taper requirements along the first end section.

B. Embodiments

Although not illustrated in all of the embodiments described here, it should be appreciated that each embodiment includes some type of textured reflecting surface 28 that serves to "randomize" the reflection angles of light rays subtending the surface. In a particularly advantageous embodiment of the invention the reflecting surface is coated with a white paint, plastic or some other suitable material that forms a molecular bond and hence a suitable randomizing texture.

Referring now to FIGS. 4 through 7, an exemplary light guide or light pipe assembly 10 according to the present invention is illustrated. Assembly 10 generally includes three separate, albeit interconnected, components including, a light guide 12a, and first and second light sources 14 and 16, respectively. Guide 12a is generally an elongated plastic, glass, etc., member that extends from a first end 18 to a second end 20 and that forms a bend or curve between the first and second ends 18 and 20, respectively. The material used to form guide 12a may be clear or provided with some color tint (e.g., orange, yellow, red, etc.). More specifically, guide 12a generally has a rectilinear cross-sectional area having a front or emitting surface 30, a back or reflecting surface 28 that faces in a direction opposite front surface 30, a top surface 32 and a bottom surface 33 that faces in a direction opposite top surface 32. Guide 12a generally has first and second end sections 22 and 24 that are formed adjacent first and second ends 18 and 20, respectively, and a mid-section or middle section 26 that is formed between first end section 22 and second end section 24. Generally, each of the first and second end sections 22, 24 is substantially straight while mid-section 26 forms the bent or curved portion of guide 12a. In the embodiment illustrated in FIGS. 4–7, mid-section 26 forms a bend such that back surface 28 is concave while front surface 30 is outwardly convex.

Figure 4:
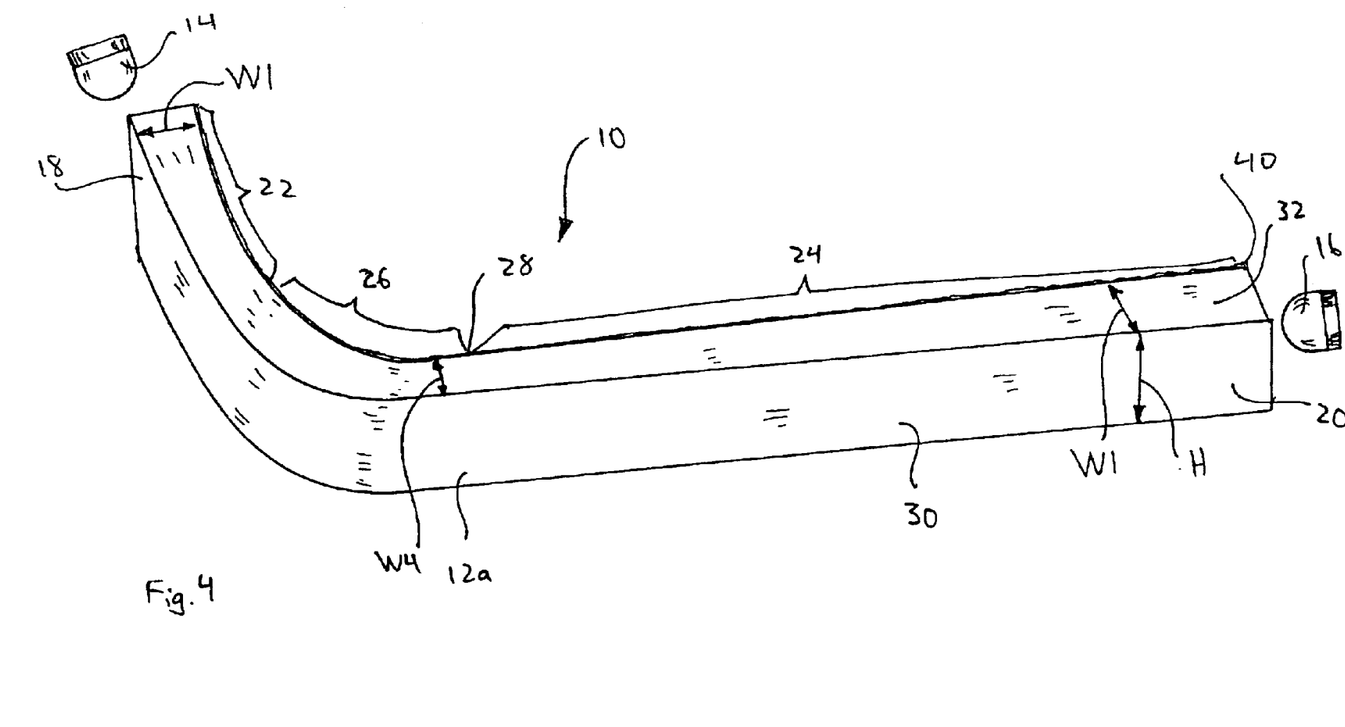
FIG. 4 is a perspective view of one embodiment of a light guide according to the present invention.
Figure 5:
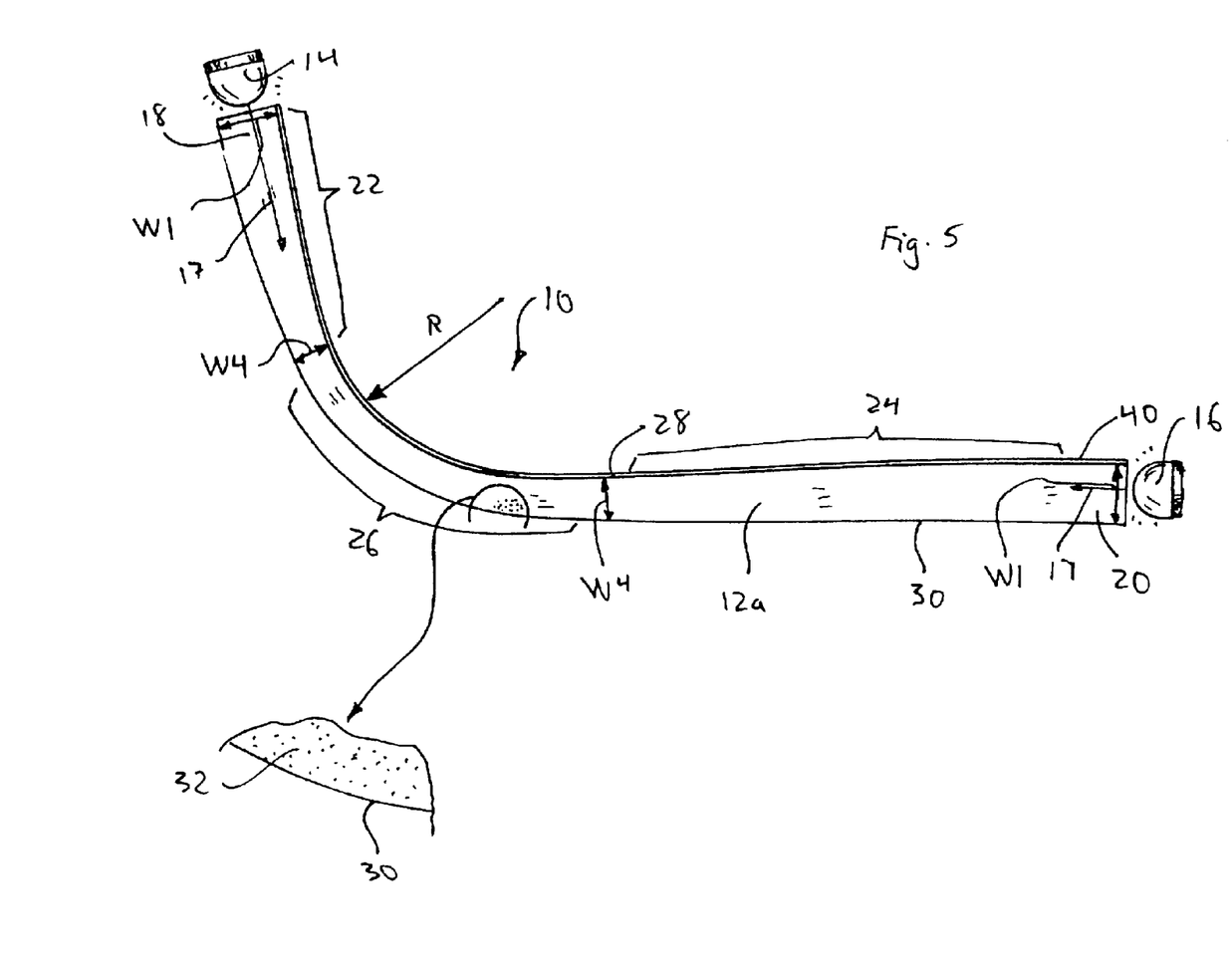
FIG. 5 is a top plan view of the light guide of FIG. 4.

As illustrated in FIGS. 4 and 5, first light source 14 is positioned such that a central ray 17 of light from source 14 is directed toward guide end 18. Similarly, second light source 16 is positioned such that central light ray 17 therefrom is directed toward and into second guide end 20. Each of light sources 14 and 16 may take any of several different forms including a small light bulb, an LED, etc. Although not illustrated, ends 18 and 20 may be constructed so as to form recesses for receiving corresponding light sources 14 and 16 for mounting the light sources 14 and 16 in positions that cause light therefrom to be directed into ends 18 and 20.

Referring still to FIGS. 4 and 5, reflecting surface 28 is treated in some fashion essentially uniformly along the entire guide 12 to provide a textured surface that randomizes reflection angles of light rays that subtend the surface 28. To this end, surface 28 may be coated with a white or other color paint, may be textured with a scratched or etched pattern, may have a plastic coating or layer member bonded thereto, etc. Number 40 represents the texture in FIGS. 4 and 5.

Figure 6:
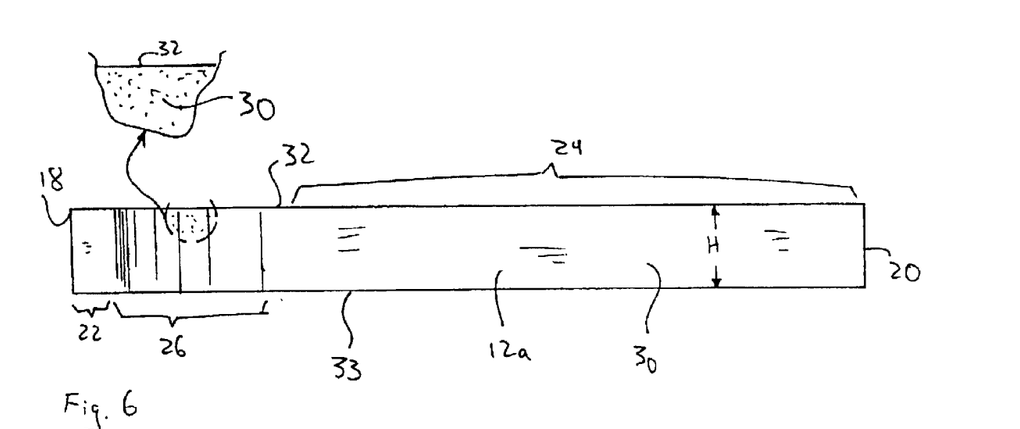
FIG. 6 is a front plan view of the light guide of FIG. 4.
Figure 7:
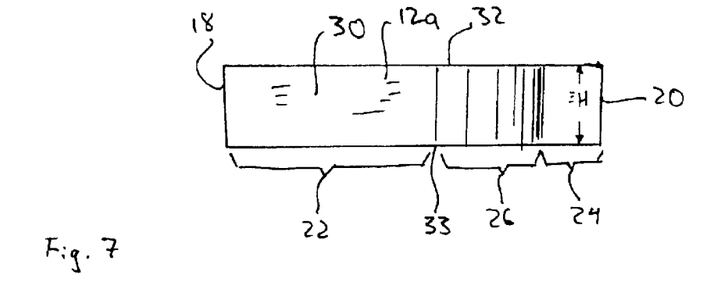
FIG. 7 is a side plan view of the light guide of FIG. 4.

Referring specifically to FIGS. 6 and 7 in this first embodiment, guide 12a has a uniform height dimension H between the top and bottom guide surfaces 32 and 33, respectively. However, referring also to FIGS. 4 and 5, guide 12a has a width dimension (e.g., W1, W4, etc.) that varies along the lengths of each of the first and second end sections 22 and 24, respectively, the width dimension being between the front and back surfaces 30 and 28, respectively. More specifically, adjacent ends 18 and 20, each of end sections 22 and 24 has a first width dimension W1 and, at the ends of end sections 22 and 24 adjacent mid-section 26, each of end sections 22 and 24 is characterized by a second width dimension W4 which is smaller than the first width dimension W1, each end section 22 and 24 tapering from its respective distal end 18, 20 toward mid-section 26.

Figure 8:
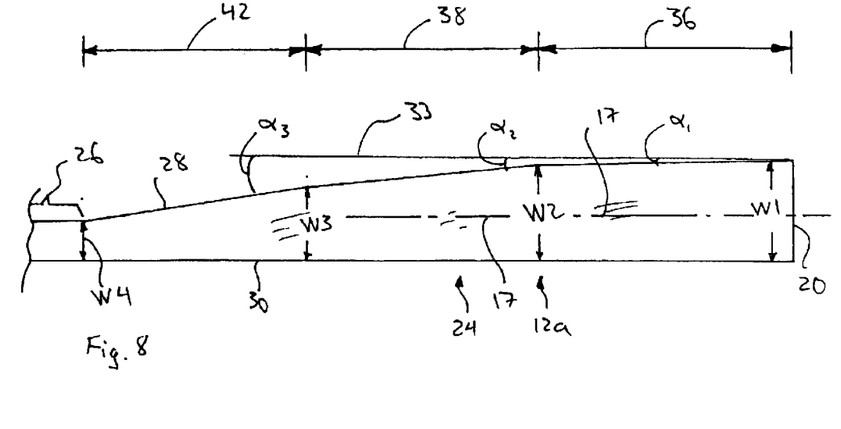
FIG. 8 is a schematic diagram illustrating one end section of a light guide.

Although difficult to observe in FIGS. 4 and 5, the degree of taper of each of end sections 22 and 24 increases along the end section when moving from the source end (e.g., 18 or 20) toward mid-section 26. Referring also to FIG. 8, an exemplary end section 24 is illustrated where the relative degrees of taper moving from end 20 toward mid-section 26 have been exaggerated in order to illustrate the tapering aspect of the present invention. In addition, changes in the degree of taper corresponding to different segments of end section 24 have been shown in a stepwise fashion to illustrate the rate of taper change. To this end, end section 24 is illustrated as having three essentially equi-sized segments Including a first segment 36 adjacent end 20, a second segment 38 adjacent first segment 36 and a third segment 42 that is between mid-section 26 and second segment 38. For instance, where end section 24 is 4½ inches long, each of segments 36, 38 and 42 may be 1½ inches long. An axis 33 is illustrated that is substantially parallel to a central ray light axis 17. As illustrated, along first segment 36, back surface 28 is tapered toward central light axis 17 so as to form an angle $\alpha_1$ with axis 33 and hence with axis 17. Thus, the width dimension of segment 36 tapers from a width W1, at end 20 to a width W2 adjacent second segment 38.

Referring still to FIG. 8, along second segment 38, back or reflecting surface 28 tapers toward central axis 17 so as to form an angle $\alpha_2$ with axis 33 where angle $\alpha_2$ is greater than angle $\alpha_1$. Here, the width formed between back surface 28 and front surface 30 begins adjacent segment 36 at width W2 and tapers to a reduced width W3 at the other end of segment 38 and adjacent third segment 42. Along segment 42, back surface 28 tapers toward central axis 17 so as to form a third taper angle $\alpha_3$ with respect to axis 33 where angle $\alpha_3$ is greater than angle $\alpha_2$. Thus, segment 42 tapers from width W3 adjacent segment 38 to reduced width W4 adjacent mid-section 26.

Although various formulas could be used and other formulas are contemplated for determining the degree of taper along end sections (e.g., 24), in at least one embodiment, where the length of an end section (e.g., 24) is divided into a plurality of equi-sized segments (e.g., 36, 38, 42, etc), the degree of taper changes by two degrees between each two adjacent segments. For example, referring still to FIG. 8, adjacent end 20, the degree of taper $\alpha_1$ may be 1° while, at the end of segment 38 adjacent segment 36, the degree of taper $\alpha_2$ may be 3° and, at the end of segment 42 adjacent segment 38, the degree of taper $\alpha_3$ may be 5°. In some embodiments, as illustrated in FIG. 8, the degree of taper from an end like end 22 the mid-section 26 may be step-wise while, in other embodiments, the degree of taper may change in a smooth fashion as opposed to as in a step-wise fashion. A smooth change in the degree of taper is generally illustrated in FIGS. 4 and 5.

Figure 9:
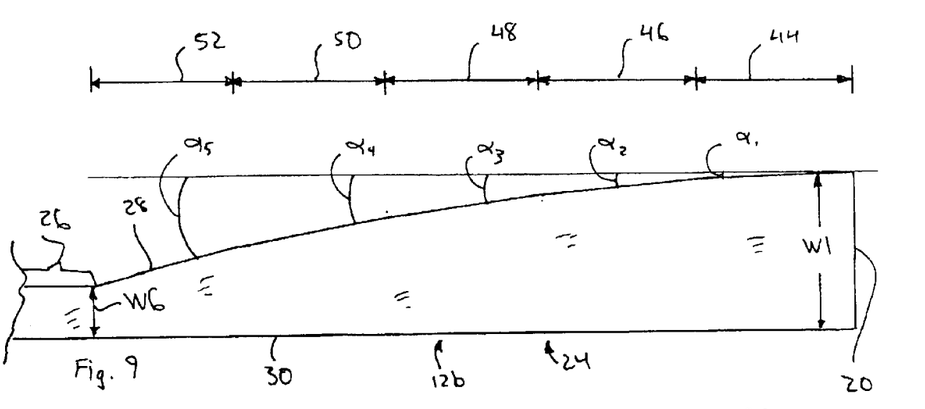
FIG. 9 is a similar to FIG. 8, albeit illustrating a different end section of a light guide.

Referring now to FIG. 9, an end section 24 corresponding to a second guide embodiment 12b is illustrated. In FIG. 9, instead of dividing the end section 24 into three separate and equi-sized segments 36, 38 and 42 as in FIG. 8, end 24 of guide 12b has been divided into five equi-sized segments including a first segment 44 adjacent end 20, a fifth segment 52 adjacent end 26 and second, third and fourth segments 46, 48 and 50 that traverse the distance between first and fifth segments 44 and 52, respectively. Here, again, the segments 44 through 52 are shown as having stepped taper changes and the step changes have been exaggerated to illustrate the changing taper aspect of the present invention. Consistent with the description above, for instance, in at least one embodiment, the degrees of taper $\alpha_1$, $\alpha_2$, $\alpha_3$, $\alpha_4$ and $\alpha_5$ corresponding to segments 44, 46, 48, 50 and 52 may be 1°, 3°, 5°, 7° and 9°, respectively. Once again, in some embodiments, instead of having a step-wise change in degree of taper, the degree of taper may be altered in a smooth fashion similar to the fashion illustrated in FIGS. 4 and 5.

Referring now to FIGS. 4 and 5 and, as described above, the width dimension W1 at each of the ends 18 and 20 should be at least as wide and, generally, at least slightly larger than a similarly aligned dimension of the light source adjacent thereto. For instance, in the case of a conventional off the shelf LED, the dimension W1 of end 20 may be $5/16^{th}$ of an inch. So that when an exemplary LED light source 16 is positioned adjacent end 20, end 20 will capture and guide most of the light from source 16.

Referring again to FIG. 8, the lengths of equi-sized segments 36, 38 and 40 are, generally, a function of the dimension W1 at end 20. As described above, it has been determined that a guide consistent with the present invention operates in a desirable fashion where the length of each end section segment (e.g., 36) is within a range of 3–7 times the width dimension W1 at end 20. For instance, consistent with the example above, where width dimension W1 is 5/16 of an inch, the length of segment 36 may be anywhere within the range of $15/16$ of an inch to $35/16$ of an inch. In at least one embodiment, it has been determined that a particularly suitable length for segment 36 is approximately 5 times width dimension W1 at end 20. Again consistent with the discussion above, where width W1 is $5/16^{ths}$ of an inch, the length of segment 36 may be $25/16^{ths}$ of an inch or, approximately 1½ inches.

Thus, in effect, the light source dimension that is aligned with dimension W1 at end 20 determines the range or possible lengths for segments 36, 38, etc., along end section 24 and also affects the rate of taper change along the end section 20 length. For instance, where width W1 is increased, the length of segment 36 and other similar segments along section 24 will likewise increase.

Referring now to FIGS. 4, 5 and 6, in at least one embodiment of the invention, at least some portion of the top and/or bottom surfaces 32 and 33, respectively, is provided with a texture and, at least some portion of the front surface 30 is provided with a texture where the textures are selected to affect the a mount of light emitted from front surface 30. In one embodiment, the textures on surfaces 30, 32 and 33 are provided along mid-section 26. In other embodiments, some texture is provided along portions of each of end sections 22 and 24 and, specifically, the portions of end sections 22 and 24 adjacent mid-section 26. In some embodiments the degree of texture on one or all of the surfaces 30, 32 and 33 changes along different sections of the guide. For instance, there may be a greater degree of texture provided along mid-section 26 than there is provided along end sections 22 and 24.

It should be noted that, while some of the embodiments of the present invention include texture along some surfaces of the light guide, the amount of texturing required along the surfaces and the variance in texture between different surface sections is much less than required in prior art teachings. Here, a uniform light emission can be provided with limited texturing and texture variance because, in addition to using the texture to affect the amount of light emitted from different sections of the guide, the degree of taper between the back surface 28 and the central light ray 17 is also used to control light emission.

Figure 10:
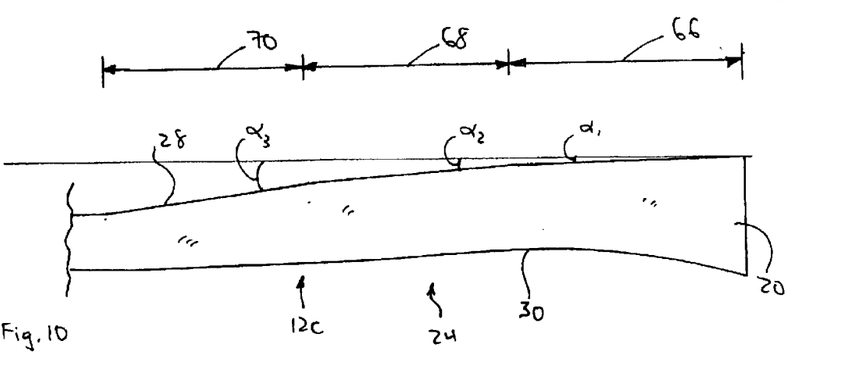
FIG. 10 is similar to FIG. 8 albeit illustrating yet one other end section of a light guide.

Referring now to FIG. 10, an end section 24 of a third guide embodiment 12c is illustrated. Guide section 24 includes three equi-spaced segments 66, 68 and 70 and a reflecting surface 28 that forms different degrees of taper $\alpha_1$, $\alpha_2$ and $\alpha_3$ corresponding to each of segments 66, 68 and 70. However, guide 12c is different than the previously illustrated guides in that front surface 30 is not a completely flat surface and instead includes a slight curve. A surface like curved surface 30 in FIG. 10 may be necessary to provide a certain stylistic flair required for a specific application. As indicated above, slight curves in the emitting surface of a guide where the emitting surface is still essentially parallel to the central light axis only minimally affect light emission and hence are acceptable. Again, it is the tapered reflecting surface that is used as a primary control of emitted light and not the emitting surface.

Figure 11:
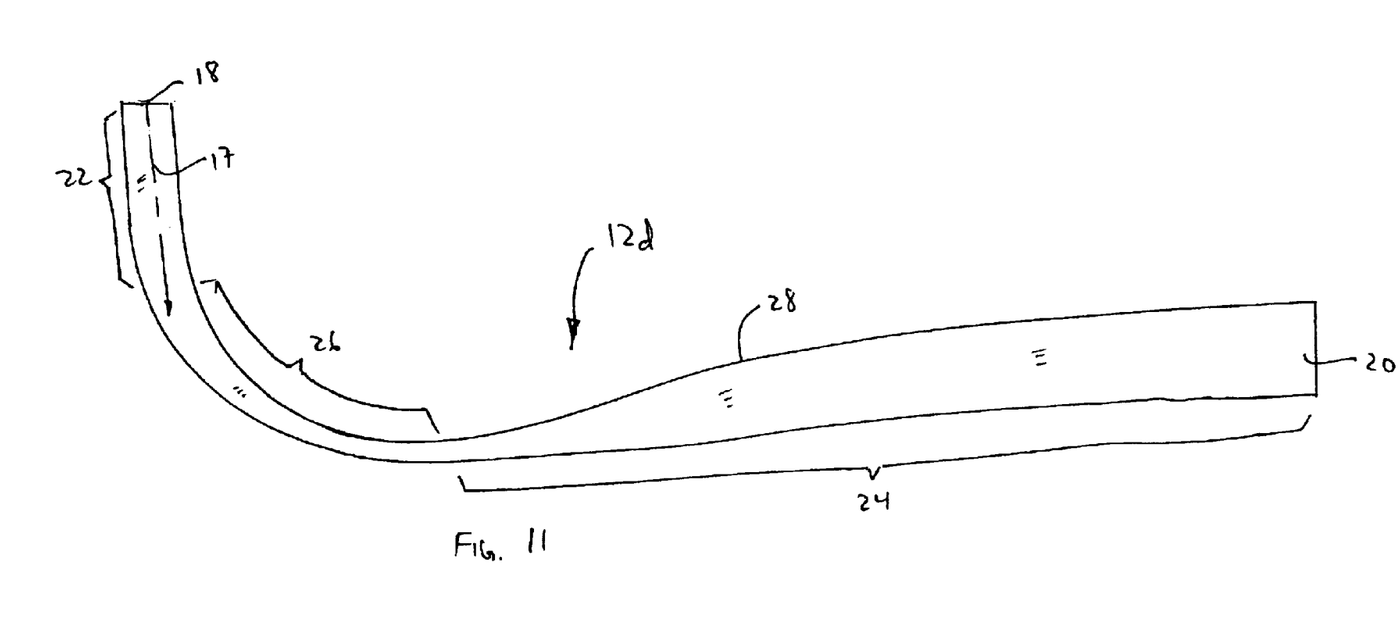
FIG. 11 is a top plan view of yet another light guide according to the present invention.

Referring now to FIG. 11, a fourth guide embodiment 12d is illustrated. Guide 12d is similar to the guide described above with reference to FIGS. 4 through 7 except that, instead of including tapered reflecting surfaces at both the first and second ends 18, 20, respectively, surface 28 is only tapered at end 20. In this regard, it has been recognized that if the length of an end section is relatively small (e.g., less than 5 times the width of the section at the light end), taper is not necessary. Thus, as illustrated in FIG. 11, the dimension between back surface 28 and central ray 17 is constant along the entire relatively short end section 22. It should also be appreciated that guide 12d is an example of a configuration where the mid-section does not include a uniform width dimension but, instead, tapers from end section 22 toward end section 24.

Figure 12:
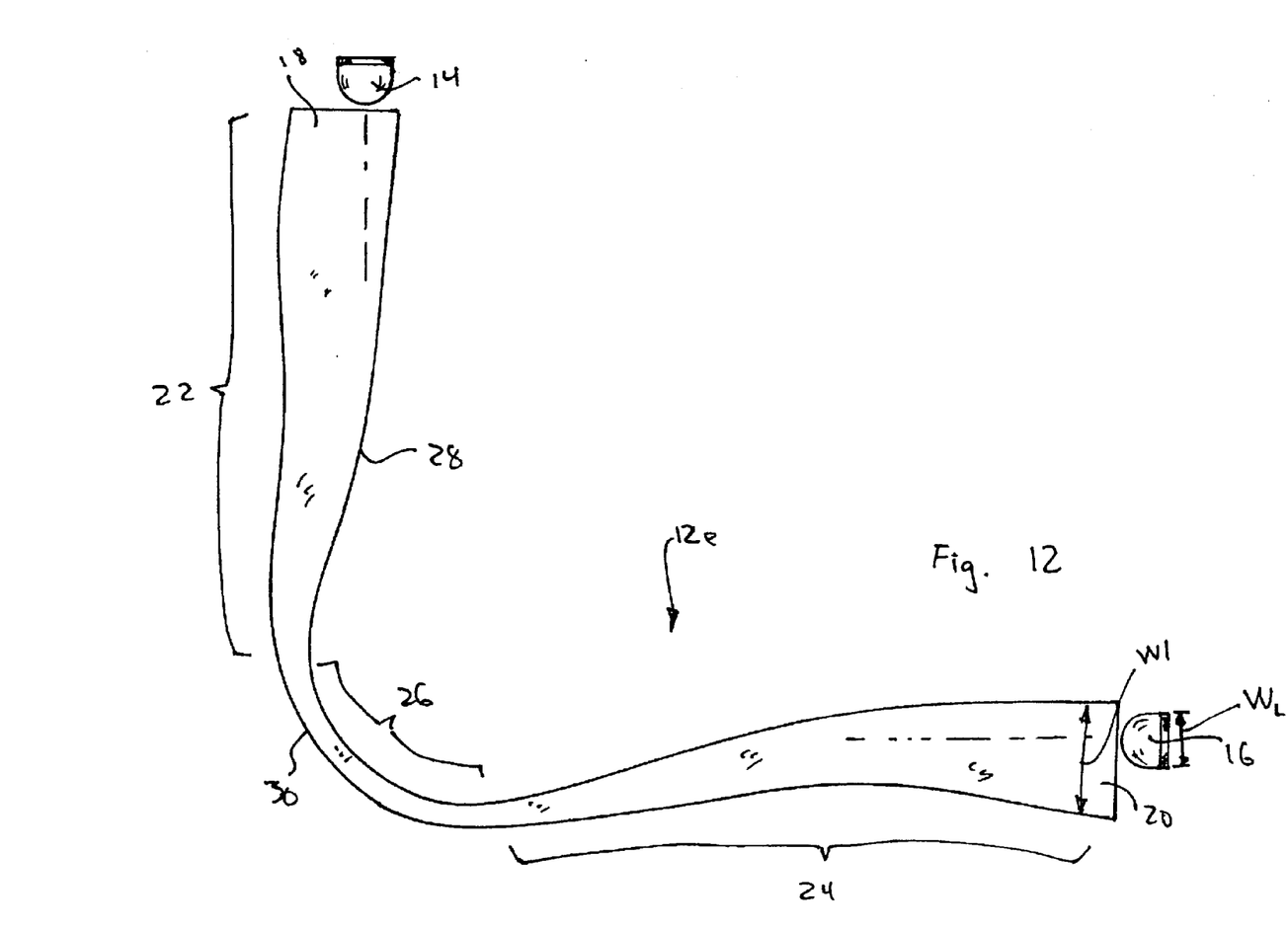
FIG. 12 is similar to FIG. 11, albeit illustrating yet one more light guide according to the present invention.

Referring now to FIG. 12, fifth guide embodiment 12e is illustrated. Here, guide 12e includes two relatively long end sections 22 and 24 that are identically formed and that are linked together by a curved mid-section 26. Because each of end sections 22 and 24 is relatively long, reflecting surface 28 forms a taper along each end section 22 and 24. In addition, as illustrated in FIG. 12, emitting surface 30 includes slight undulations which, as indicated above, are tolerable for providing various stylistic configurations.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

To apprise the public of the scope of this invention, the following claims are made:

What is claimed is:

1. A lighting apparatus for providing a substantially uniformly illuminated light emitting surface, the apparatus comprising:

first and second light sources generating flux patterns including light rays that diverge about first and second central light rays, respectively; and a light guide member having substantially straight first and second end sections and a curved section, the first end section having a proximal end and a distal end and formed about a first light axis, the second end section having a proximal end and a distal end and formed about a second light axis, the curved section including first and second ends that are linked to the distal ends of the first and second end sections, respectively, the guide forming a front surface and an oppositely facing textured back surface along each of the end sections and the curved section, the curved section forming a bend such that the back surface is concave and the front surface is convex along the curved section length, at least a portion of the back surface tapered toward the first light axis in the direction from the proximal end to the distal end of the first end section;

wherein, the first light source is juxtaposed such that the central light ray is directed along the first light axis and the second light source is juxtaposed such that the central light ray is directed along the second light axis.

2. The apparatus of claim 1 wherein the degree of taper along the first end section increases from the proximal end to the distal end.

3. The apparatus of claim 2 wherein at least a portion of the back surface tapers toward the second light axis in the direction from the proximal end to the distal end of the second end section and the degree of taper along the second end section increases from the proximal end to the distal end.

4. The apparatus of claim 3 wherein the rate of taper increase is constant along the lengths of each of the first and second end sections.

5. The apparatus of claim 4 wherein the first end section includes X equi-length segments and the degree of taper changes N degrees along each of the X segments.

6. The apparatus of claim 5 wherein N is between 1 and 5 degrees.

7. The apparatus of claim 6 wherein the first end section forms a proximal end width dimension between the front and back surfaces and the length of each equi-length segment is between three and seven times the proximal end width dimension.

8. The apparatus of claim 7 wherein the length of each equi-length segment is approximately five times the proximal end width dimension.

9. The apparatus of claim 3 wherein a width dimension between the back and front surfaces is uniform along the length of the curved section.

10. The apparatus of claim 1 wherein texture is provided along at least a portion of the front surface.

11. The apparatus of claim 1 wherein the guide top and bottom surfaces and wherein at least a portion of each of the top and bottom surfaces is textured.

12. The apparatus of claim 1 further including a coating layer on the back surface and wherein the texture is provided on the back surface by a molecular bond between the coating layer and the back surface.

13. The apparatus of claim 12 wherein the coating layer includes a plastic member.

14. The apparatus of claim 12 wherein the coating layer has a white color.

15. The apparatus of claim 1 wherein the first and second light axis form an angle between 60 degrees and 130 degrees.

16. The apparatus of claim 15 wherein the first and second light axis form an angle of approximately 90 degrees.

17. A lighting apparatus for providing a substantially uniformly illuminated light emitting surface, the apparatus comprising:

a light source generating a flux pattern including light rays that diverge about a central light ray; and a light guide member having a substantially straight end section and a curved section, the end section having a proximal end and a distal end and formed about a light axis, the curved section including first and second ends and linked at the first end to the distal end of the end section, the guide forming a front surface and an oppositely facing and textured back surface along the end section and the curved section, the curved section forming a bend such that the back surface is concave and the front surface is convex along the curved section length, at least a portion of the back surface tapered toward the light axis in the direction from the proximal end to the distal end;

wherein, the light source is juxtaposed such that the central light ray is directed along the light axis.

18. The apparatus of claim 16 wherein the degree of taper increases from the proximal end to the distal end.

19. The apparatus of claim 18 wherein the rate of taper increase is constant along the length of the end section.

20. The apparatus of claim 19 wherein the end section includes X equi-length segments and the degree of taper changes N degrees along each of the X segments.

21. The apparatus of claim 20 wherein N is between 1 and 5 degrees.

22. The apparatus of claim 21 wherein the end section forms a proximal end width dimension between the front and back surfaces and the length of each equi-length segment is approximately five times the proximal end width dimension.

23. The apparatus of claim 17 wherein texture is provided along at least a portion of the front surface.

24. The apparatus of claim 17 further including a coating layer on the back surface and wherein the texture is provided on the back surface by a molecular bond between the coating layer and the back surface.

25. The apparatus of claim 24 wherein the coating layer includes a plastic white member.

26. The apparatus of claim 17 wherein the end section is a first end section and the light source is a first source, the apparatus further including a second end section and a second light source, the second end section including proximal and distal ends and formed about a second light axis, the second light source generating a flux pattern including light rays that diverge about a central light ray, the second end section linked to the second end of the curved section and the second light source is juxtaposed such that the central light ray of the second source is directed along the second light axis.

27. The apparatus of claim 26 wherein the first and second light axis form an angle of approximately 90 degrees.

28. The apparatus of claim 27 wherein at least a portion of the back surface tapers toward the second light axis in the direction from the proximal end to the distal end of the second end section and the degree of back surface taper is greater at the distal end than at the proximal end of the first end section and the degree of taper is greater at the distal end than at the proximal end of the second end section.

29. The apparatus of claim 17 wherein the front surface is substantially parallel to the light axis along the end section.

30. The apparatus of claim 17 wherein at least a portion of the front surface forms an angle with respect to the light axis.

* * * * *